(12) United States Patent
Norys et al.

(10) Patent No.: US 11,824,914 B1
(45) Date of Patent: Nov. 21, 2023

(54) SYSTEM AND METHOD FOR STREAMING MEDIA TO A PUBLIC SAFETY ACCESS POINT WITHOUT INCURRING ADDITIONAL USER COSTS

(71) Applicant: MOTOROLA SOLUTIONS, INC., Chicago, IL (US)

(72) Inventors: Filip Norys, Chrzanow (PL); Grzegorz Gustof, Myslenice (PL); Rafal Kaminski, Wosa (PL); Robert Orzechowski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/055,483

(22) Filed: Nov. 15, 2022

(51) Int. Cl.
*H04L 65/75* (2022.01)
*H04W 88/08* (2009.01)
*G06Q 50/00* (2012.01)

(52) U.S. Cl.
CPC .......... *H04L 65/762* (2022.05); *H04W 88/08* (2013.01); *G06Q 50/01* (2013.01)

(58) Field of Classification Search
CPC ..... H04L 65/762; H04L 65/75; H04L 65/765; G06Q 50/01; H04W 4/90; H04W 76/50; H04M 3/5116
See application file for complete search history.

(56) References Cited

U.S. PATENT DOCUMENTS

| | | | |
|---|---|---|---|
| 8,195,215 B2 | 6/2012 | Marocchi et al. | |
| 8,760,290 B2 | 6/2014 | Piett et al. | |
| 8,923,801 B2 * | 12/2014 | Fletcher | H04M 3/5232 455/404.1 |
| 8,982,783 B2 | 3/2015 | Miller et al. | |
| 9,071,986 B2 | 6/2015 | Blanco et al. | |
| 9,148,770 B2 * | 9/2015 | Mohler | H04W 4/029 |
| 9,351,020 B2 | 6/2016 | Good | |
| 9,654,955 B2 * | 5/2017 | Fletcher | H04M 3/5232 |
| 10,425,697 B2 * | 9/2019 | April | H04N 21/8456 |
| 10,762,769 B1 * | 9/2020 | Sommerlatt | G08B 25/12 |
| 10,805,687 B2 * | 10/2020 | April | H04N 21/4316 |
| 11,039,218 B1 * | 6/2021 | April | H04L 65/65 |
| 11,057,897 B1 * | 7/2021 | Negahban | H04W 72/51 |
| 11,330,028 B2 * | 5/2022 | Qiao | H04L 65/762 |
| 11,330,664 B1 * | 5/2022 | Martin | H04L 65/1033 |
| 11,356,742 B2 * | 6/2022 | Azuolas | H04L 65/65 |
| 11,528,772 B2 * | 12/2022 | Horelik | H04M 3/5183 |
| 2013/0052983 A1 * | 2/2013 | Fletcher | H04L 67/303 455/404.2 |

(Continued)

*Primary Examiner* — David R Lazaro

(57) ABSTRACT

Techniques for streaming media to a public safety access point without incurring additional user costs are provided. A media stream from a mobile device is received at a communications network. The media stream being streamed from the mobile device to a social media platform in a first format. A request from a Public Safety Access Point to stream the media from the mobile device in a second format is received at the communications network. A request is sent to the mobile device to send the media stream in the second format. The media stream received from the mobile device in the second format is converted to the first format. The media stream received in the second format is sent to the Public Safety Access Point. The converted media stream in the first format is sent to the social media platform.

20 Claims, 8 Drawing Sheets

(56) References Cited

U.S. PATENT DOCUMENTS

| | | | |
|---|---|---|---|
| 2013/0052984 A1* | 2/2013 | Mohler | H04M 3/5116 |
| | | | 455/404.2 |
| 2014/0057590 A1* | 2/2014 | Romero | G08B 25/08 |
| | | | 455/404.2 |
| 2014/0189064 A1 | 7/2014 | Cilli et al. | |
| 2015/0111526 A1* | 4/2015 | Fletcher | H04W 4/021 |
| | | | 455/404.2 |
| 2015/0312572 A1 | 10/2015 | Owen | |
| 2017/0201559 A1* | 7/2017 | Oh | H04L 67/02 |
| 2018/0160153 A1* | 6/2018 | Rajewski | H04N 21/4185 |
| 2019/0014613 A1* | 1/2019 | Antsev | H04M 1/72463 |
| 2021/0081559 A1* | 3/2021 | Gratton | H04W 4/02 |
| 2021/0152687 A1* | 5/2021 | Reber | H04L 65/1076 |
| 2021/0217292 A1* | 7/2021 | Dobkins | H04W 4/029 |
| 2022/0210272 A1* | 6/2022 | Horelik | H04W 4/021 |
| 2022/0377841 A1* | 11/2022 | Martin | H04L 65/1069 |
| 2023/0217546 A1* | 7/2023 | Horelik | H04M 11/04 |
| | | | 379/45 |

* cited by examiner

SYSTEM AND METHOD FOR STREAMING MEDIA TO A PUBLIC SAFETY ACCESS POINT WITHOUT INCURRING ADDITIONAL USER COSTS

BACKGROUND

In today's world, the presence of media recording devices, such as video cameras is every increasing. An ever increasing number of adults, and children, may constantly carry at least one device (e.g. smartphone, tablet, etc.) that is capable of recording media. For example, all modern smartphones are equipped with a video camera. In most cases, the devices are also capable of streaming that captured media live, via a communications network, to a media receiver. For example, media may be streamed live via $3^{rd}$ generation (3G) cellular networks, $4^{th}$ generation Long Term Evolution (LTE) networks, and $5^{th}$ generation networks (5G).

In many cases the destination for live streamed media may be a social network website that is available to the public. For example, Facebook™, Instagram™ Snapchat™, Twitch™, etc. all provide the ability to receive a live media stream from their users. When an event of interest occurs (e.g. natural disaster, riot, fire, active shooter, etc.), the first reaction of many bystanders is to pull out their smartphone and begin recording and streaming the event to a social media site, such as one of the example social media sites previously mentioned. The streamed media of the event of interest can then be viewed by the public.

The availability of streamed media that captures events of interest can be very valuable for public safety personnel. For example, if a crime is occurring, such as an active shooter incident, and someone is live streaming media from the incident scene, this can be very helpful to law enforcement personnel. As such, public safety officials may monitor live video streams from various social media sites to learn about incidents that may require a public safety response.

In addition, sophisticated video analytics techniques may be used by public safety officials to automatically monitor live streamed media and raise an alert for further investigation when an event of interest is noted. For example, video/audio analytics may be run to the live streamed video to detect the presence of gunshots. If gunshots are detected, a public safety official may be given an alert to further investigate the circumstances surrounding the gunshot detection.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
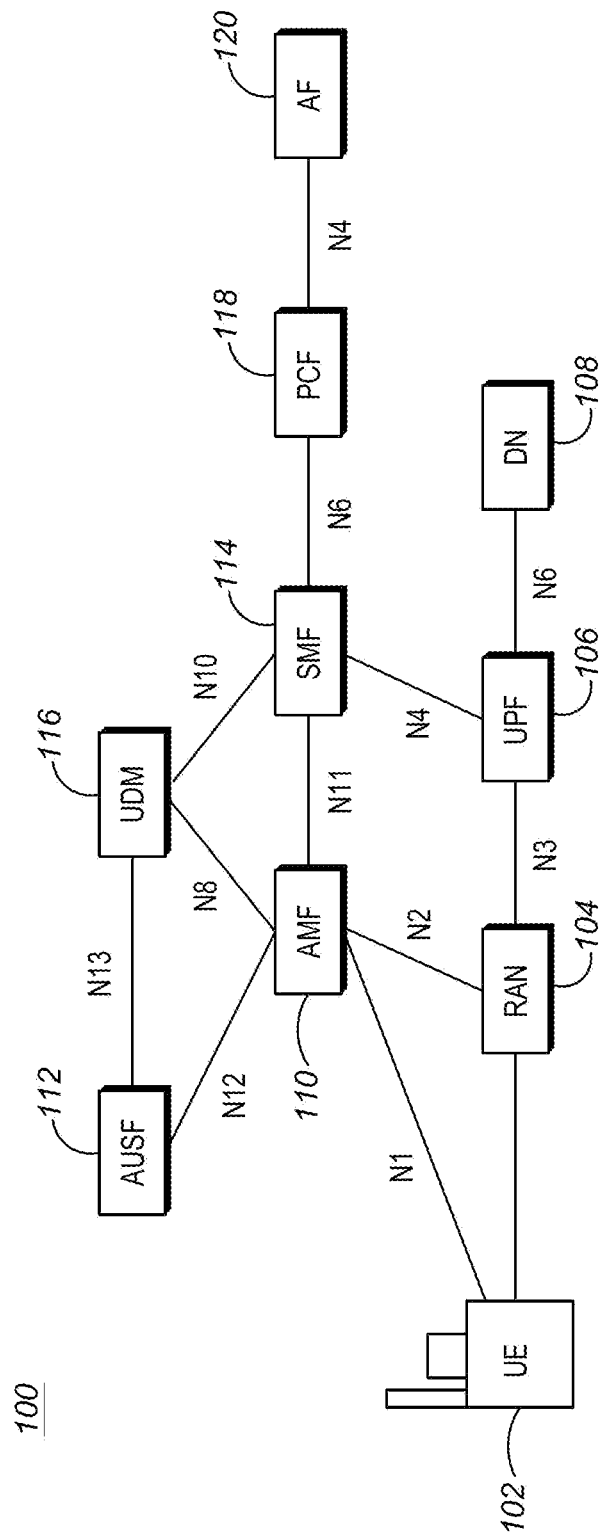
FIG. 1 illustrates an example 5G system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Although the ability to identify events of interest in real time as they are streamed to social media is very valuable to public safety personnel, several problems exist. One of those problems may be that the streamed media is not being provided in a format that is usable by public safety personnel for public safety purposes, although still being satisfactory for social media purposes. For example, public safety personnel may need streamed video to be in a higher resolution for evidentiary purposes. A video stream at 720p (i.e. standard definition) may be suitable for viewing on a social media website, but might not be of sufficient quality for use as evidence for person identification in a court room. A lower resolution stream may not be suitable for certain video analytics (e.g. facial recognition, weapons detection, etc.).

There are several reasons why solving this problem is not simply a matter of streaming to the social media platform at a quality suitable for public safety use. Initially, the social media platforms themselves may not be capable of handling video streamed in a higher quality. Some social media sites may even limit the bandwidth available to stream media to the site. In addition, streaming the higher quality media may use more data on the sender's data plan. If the sender does not have an unlimited data usage, streaming at the higher quality could end up incurring additional costs on the end user.

The problems are not only limited to bandwidth constraints associated with streaming media at a higher quality. In many cases, metadata associated with the media stream may be sent to the social media site, but that metadata is not made available to the public via the social media site. For example, the metadata may include global positioning system (GPS) data indicating where the source of the streaming media is located. Although that information may be provided to the social media site operator, it might not be made available to the public that is accessing the social media site to view the stream. Such metadata may be useful for public safety purposes.

The techniques described herein solve these problems individually and collectively. A user may stream media to a social networking site. Public safety may determine that a particular media stream is of interest, but the media parameters (e.g. resolution, frame rate, video codec, etc.) are not suitable for public safety use. A request is sent to the network infrastructure to request the media stream in a format acceptable to the public safety user. The network infrastructure communicates with the media streamers device to request that the media stream be sent using parameters that are suitable for public safety use.

The user device may receive the request to begin streaming media using different parameters. In some implementations, the user may need to accept the request and has the option of denying the request. Assuming the user accepts the request, the user device begins streaming the media using the requested parameters to the network infrastructure. The network infrastructure then provide the media stream with the requested parameters to the public safety requestor. In addition, metadata associated with the media stream is also provided to the public safety requester.

The network infrastructure will also convert the stream from the new format (e.g. using the parameters requested by the public safety requester) back to the original media stream that was being sent to the social media site and complies with the requirements of the social media site. As such, the social media site is not receiving anything different than what was previously being received. In fact, the social media site need not even be aware that the higher quality media stream is being sent to the public safety requester. What should be noted is that only the media stream that has been converted and sent to the social media site will pass through the network charging function. Thus the users data usage would only be charged as if the original media stream was being sent to the social networking site.

A method is provided. The method includes receiving, at a communications network, a media stream from a mobile device, the media stream being streamed from the mobile device to a social media platform, the media stream being streamed in a first format. The method further includes receiving, at the communications network, a request from a Public Safety Access Point (PSAP), to stream the media stream from the mobile device to the PSAP, the request including a request for the media stream from the mobile device in a second format. The method further includes sending a request to the mobile device to send the media stream in the second format. The method further includes converting the media stream received from the mobile device in the second format to the first format. The method further includes sending the media stream received in the second format to the PSAP. The method further includes sending the converted media stream in the first format to the social media platform.

In one aspect of the method, the first format and the second format are different resolutions, wherein the second format is a higher resolution than the first format. In one aspect of the method the first format and the second format are different frame rates, wherein the second format is higher frame rate than the first format. In one aspect of the method the first format and the second format are different media codecs. In one aspect of the method the media stream received in the second format that is sent to the PSAP bypasses a charging function of the communications network associated with the mobile device. In one aspect of the method the media stream received in the second format that is sent to the PSAP is sent via a network slice that is different than a network slice used to send the media stream in the first format to the social media platform.

In one aspect of the method the communications network further comprises a 5G Mobile Edge Computing (MEC) node configured to receive the request from the PSAP, convert the media stream received from the mobile device in the second format to the first format, send the media stream received in the second format to the PSAP, and send the converted media stream in the first format to the social media platform.

In one aspect of the method the converted media stream is sent via a dedicated network slice. In one aspect the method further comprises receiving a response from the mobile device, the response indicating the mobile device has accepted the request to send the media stream in the second format. In one aspect the method further comprises sending metadata associated with the social media platform to the PSAP.

A system is provided. The system includes a processor and a memory coupled to the processor. The memory contains a set of instructions that when executed by the processor causes the processor to receive, at a communications network, a media stream from a mobile device, the media stream being streamed from the mobile device to a social media platform, the media stream being streamed in a first format. The memory also includes instructions to cause the processor to receive, at the communications network, a request from a Public Safety Access Point (PSAP), to stream the media stream from the mobile device to the PSAP, the request including a request for the media stream from the mobile device in a second format. The memory also includes instructions that cause the processor to send a request to the mobile device to send the media stream in the second format. The memory also includes instructions that cause the processor to convert the media stream received from the mobile device in the second format to the first format. The memory also includes instructions that cause the processor to send the media stream received in the second format to the PSAP. The memory also includes instructions that cause the processor to send the converted media stream in the first format to the social media platform.

In one aspect of the system the media stream received in the second format that is sent to the PSAP bypasses a charging function of the communications network associated with the mobile device. In one aspect of the system the communications network further comprises a 5G Mobile Edge Computing (MEC) node configured to receive the request from the PSAP, convert the media stream received from the mobile device in the second format to the first format, send the media stream received in the second format to the PSAP, and send the converted media stream in the first format to the social media platform. In one aspect of the system, the memory further comprises instructions to receive a response from the mobile device, the response indicating the mobile device has accepted the request to send the media stream in the second format. In one aspect of the system, the memory further comprises instructions send metadata associated with the social media platform to the PSAP.

A non-transitory processor readable medium containing a set of instructions thereon is provided. The instructions on the medium, that when executed by a processor cause the processor to receive, at a communications network, a media stream from a mobile device, the media stream being streamed from the mobile device to a social media platform, the media stream being streamed in a first format. The instructions on the medium further cause the processor to receive, at the communications network, a request from a Public Safety Access Point (PSAP), to stream the media stream from the mobile device to the PSAP, the request including a request for the media stream from the mobile device in a second format. The instructions on the medium further cause the processor to send a request to the mobile device to send the media stream in the second format. The instructions on the medium further cause the processor to convert the media stream received from the mobile device in the second format to the first format. The instructions on the medium further cause the processor to send the media stream received in the second format to the PSAP. The instructions on the medium further cause the processor to send the converted media stream in the first format to the social media platform.

In one aspect of the medium the media stream received in the second format that is sent to the PSAP bypasses a charging function of the communications network associated with the mobile device. In one aspect of the medium the communications network further comprises a 5G Mobile Edge Computing (MEC) node configured to receive the request from the PSAP, convert the media stream received from the mobile device in the second format to the first format, send the media stream received in the second format to the PSAP, and send the converted media stream in the first format to the social media platform. In one aspect the medium further comprises instructions to receive a response from the mobile device, the response indicating the mobile device has accepted the request to send the media stream in the second format. In one aspect the medium further comprises instructions to send metadata associated with the social media platform to the PSAP.

Further advantages and features consistent with this disclosure will be set forth in the following detailed description, with reference to the figures. The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

FIG. 1 illustrates a 5G system 100 in accordance with some embodiments. 5G system 100 may be capable of delivering data using enhanced characteristics compared with other systems, such as streaming of up to about 1 Gbps, file download speeds of up to about 20 Gbps, latencies as low as about 1 ms, and device connection densities of about $10^6$ devices/km$^2$, for example. 5G system 100 includes multiple 5G network functions (NFs). A network function can be implemented as a discrete network element on a dedicated hardware, as a software instance running on dedicated hardware, or as a virtualized function instantiated on an appropriate platform, e.g., dedicated hardware or a cloud infrastructure. Although not shown, RAN 104 may be connected with an evolved packet core (EPC) (or a RAN connected with the EPC), that includes mobility management entities (MME), serving gateways (S-GWs), and packet data network gateways (P-GWs), among others. RAN 104 may be 5G base stations (referred to as gNodeBs or gNBs) 104. gNB 104 may also include, or be connected to, an eNB or a general non-3GPP access point, such as that for Wi-Fi. gNB 104 may be a standalone gNB or a non-standalone gNB, e.g., operating in Dual Connectivity (DC) mode as a booster controlled by an evolved nodeB (eNB) through an X2 or Xn interface.

In 5G system 100, the control plane (CP) functionalities and the user plane (UP) functionalities are separated. This separation permits independent deployment and adaptation of the 5G system for each operator using the 5G system.

As shown, 5G system 100 includes gNB 104 in communication with UEs 102 as well as a number of elements specific to the architecture of 5G system 100 (5G core network (CN)). These 5G CN elements include a User Plane Function (UPF) 106, an Authentication Server Function (AUSF) 110, an Access and Mobility Management Function (AMF) 112, a Session Management Function (SMF) 114, a Unified Data Management (UDM) 116, a Policy Control Function (PCF) 118, and an Application Function (AF) 120. The UPF 106 may be connected to a Data network (DN) 108, which provides, for example operator services, Internet access, or other 3rd party services. The various elements are connected by the point-to-point reference points (e.g., N1, N2) shown.

UE 102 may generate, encode and encrypt uplink transmissions to, and decode and decrypt downlink transmissions from, gNB 104. A similar functionality may be provided by the entity in communication with UE 102. UPF 106 may be connected with a data network, with which UE 102 may communicate, UE 102 transmitting uplink data to or receiving downlink data from the data network. UPF 106 may, in addition to being the point of connection to DN 108, provide routing and forwarding of packets to UE 102. UPF 106 may also provide QoS handling as well as Deep Packet Inspection (DPI) for packet inspection and classification. UPF 106 may also integrate Firewall and Network Address Translation (NAT) functionality and act as an anchor for Intra RAT and Inter-RAT handovers.

AMF 112 may provide, among other functions, UE-based authentication, authorization, mobility management, security context, connection and registration management, and non-access stratum (NAS) signaling termination. SMF 114 may be responsible for, among others, session management (including establishment, modification, and termination of a session, and NAS signaling termination of the session), providing Dynamic Host Configuration Protocol (DHCP) functionality, allocation and management of IP addresses to UE 102, and providing notification of downlink data to UE 102. SMF 114 may also select and control UPF 106 for data transfer, including providing the traffic steering configuration. SMF 114 may thus act as the interface for all user plane communication and may determine how the policy and charging for these services is applied. SMF 114 may be associated with a single session of UE 102 or multiple 5G sessions of UE 102. Note that while UE 102 may have multiple sessions, each session may be allocated to a different SMF 114, thereby allowing each session to be individually managed. As a consequence, the functionalities of each session may be independent of each other.

AF 120 may provide information on the packet flow to the PCF 118 responsible for policy control to support a desired QoS. AF 120 may also provide access to the network exposure function (NEF) (not shown), which permits exposure of the services and capabilities provided by the network functions in a secure manner to an external (non-3GPP) application. The NEF provisions the control plane parameters and manages packet flow descriptors (protocol, server-side IP and port number). Similarly, the network repository function (NRF) (not shown) in the network maintains the network profile of UE 102 and available network function instances, as well as supporting the service discovery function, thereby permitting the network functions to discover each other. Also, a Network Slice Selection Function (NSSF) in the network may select the Network Slice instances to serve UE 102, determine allowed Network Slice Selection Assistance Information (NSSAI) and determine the appropriate AMF 110 to serve UE 102. The NSSF may thus redirect traffic in the network to the appropriate network slice, which may be defined for different classes of subscribers.

AUSF 110 may store data for UE authentication, including keys, acting as an authentication server for UE 102. UDM 116 may similarly store the UE subscription data (including generation of Authentication and Key Agreement (AKA) credentials for UE 102), supporting access authorization of UE 102 as well as subscription management for UE 102.

PCF 118 may provide policy rules for the control plane functions for UE 102, including mobility and session management policies. To this end, PCF 118 may use the packet flow information to determine the appropriate control plane policies for proper operation of AMF 112 and SMF 114. PCF 118 may access subscription information for policy decisions and support the 5G QoS policy and charging control functions. PCF 118 thus takes care of network policies to manage network behavior. PCF 118 obtains the subscription information from UDM 116 and interfaces to SMF 114 to manage the session contexts and to AMF 110 to manage the mobility context. PCF 118 triggers the UE route selection policy (URSP) which enables the UE to determine how a particular application should be handled in the context of an existing or new PDU (Packet Data Unit) session. The URSP may provide the UE with information about a new network slice configuration; the slice ID of the network slice may thus be communicated from PCF 118.

Note that various specialized servers are not show in FIG. 1 for convenience. As mentioned above, 5G system 100 may include multiple 5G network functions (NFs). that can be implemented as a discrete network element on a dedicated hardware, as a software instance running on dedicated hardware, or as a virtualized function instantiated on an appropriate platform, e.g., dedicated hardware or a cloud infrastructure. One example of such a network function is a Mobile Edge Computing (MEC) node that may be utilized to implement the techniques described herein. A MEC will be described in further detail below.

Figure 2:
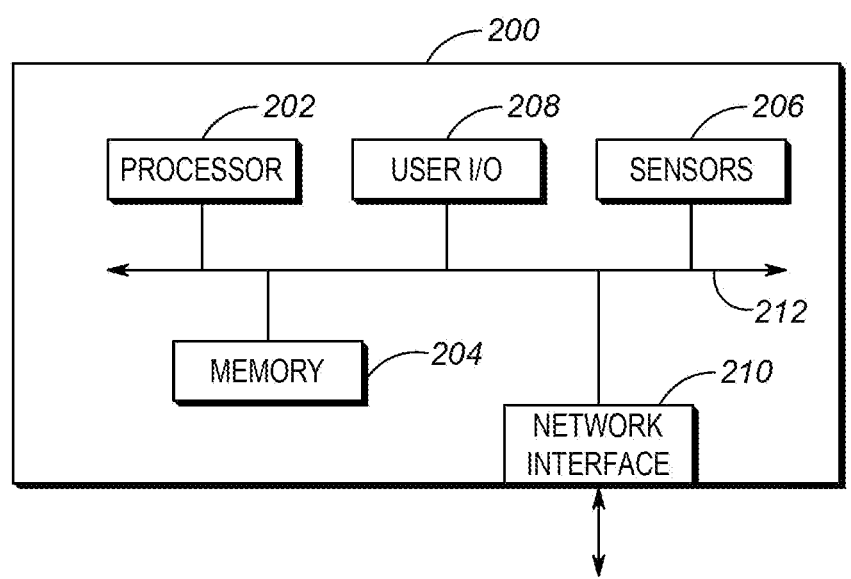
FIG. 2 illustrates an example block diagram of a communication device in accordance with some embodiments.

FIG. 2 illustrates a block diagram of a communication device 200 in accordance with some embodiments. In some embodiments, communication device 200 may be a personal device, such as a UE, or a network device, such as one or more of those described in relation to FIG. 1 (e.g., a gNB, an eNB, or other equipment used in the network environment). Communication device 200 may include a physical device and/or a virtual device, such as a server running one or more virtual network functions (VNFs) of the network shown in FIG. 1. In various examples, communication device 200 may be a specialized computer, a personal or laptop computer (PC), a tablet PC, a mobile telephone, a smartphone, a network router, switch or bridge, or any machine capable of executing instructions (sequential or otherwise) that specify actions to be taken by that machine. In some embodiments, communication device 200 may be an internet-of-things (IoT) or a narrowband IoT (NB-IoT) device or other device embedded within other, non-communication-based devices such as appliances or vehicles.

Communication device 200 may include various components connected by a bus 212. Communication device 200 may include a hardware processor 202 such as one or more central processing units (CPUs) or other processing circuitry able to provide any of the functionality described herein when running instructions. Processor 202 may be connected to a memory 204 may include a non-transitory processor readable medium on which is stored one or more sets of instructions. Memory 204 may include one or more of static or dynamic storage, or removable or non-removable storage, for example. A processor readable medium may include any medium that is capable of storing, encoding, or carrying instructions for execution by processor 202, such as solid-state memories, magnetic media, and optical media. processor readable medium may include, for example, Electrically Programmable Read-Only Memory (EPROM), Random Access Memory (RAM), or flash memory.

The instructions may enable communication device 200 to operate in any manner thus programmed, such as the functionality described specifically herein, when processor 202 executes the instructions. The processor readable medium may be stored as a single medium or in multiple media, in a centralized or distributed manner. In some embodiments, instructions may further be transmitted or received over a communications network via a network interface 210 utilizing any one of a number of transfer protocols (e.g., frame relay, internet protocol (IP), transmission control protocol (TCP), user datagram protocol (UDP), hypertext transfer protocol (HTTP), etc.).

Network interface 210 may thus enable communication device 200 to communicate data and control information with other devices via wired or wireless communication. Network interface 210 may include electronic components such as a transceiver that enables serial or parallel communication. The wireless connections may use one or more protocols, including Institute of Electrical and Electronics Engineers (IEEE) Wi-Fi 802.11, 3G, Long Term Evolution (LTE)/4G, 5G, Universal Mobile Telecommunications System (UMTS), or peer-to-peer (P2P), for example, or short-range protocols such as Bluetooth, Zigbee, or near field communication (NFC). Wireless communication may occur in one or more bands, such as the 800-900 MHz range, 1.8-1.9 GHz range, 2.3-2.4 GHz range, 60 GHz range, and others, including infrared (IR) communications. Example communication networks to which communication device 200 may be connected via network interface 210 may include a local area network (LAN), a wide area network (WAN), a packet data network (e.g., the Internet), mobile telephone networks (e.g., cellular networks), and wireless data networks. Communication device 200 may be connected to the networks via one or more wired connectors, such as a universal serial bus (USB), and/or one or more wireless connections, and physical jacks (e.g., Ethernet, coaxial, or phone jacks) or antennas.

Communication device 200 may further include one or more sensors 206, such as one or more of an accelerometer, a gyroscope, a global positioning system (GPS) sensor, a thermometer, a magnetometer, a barometer, a pedometer, a proximity sensor, and an ambient light sensor, among others. Sensors 206 may include some, all, or none of one or more of the types of sensors above (although other types of sensors may also be present), as well as one or more sensors of each type.

Sensors 206 may be used in conjunction with one or more user input/output (I/O) devices 208. User I/O devices 208 may include one or more of a display, a camera, a speaker, a keyboard, a microphone, a mouse (or other navigation device), or a fingerprint scanner, among others. User I/O devices 208 may include some, all, or none of one or more of the types of I/O devices above (although other types of I/O devices may also be present), as well as one or more I/O devices of each type.

Communication device 200 may include different specific elements depending on the particular device. For example, although not shown, in some embodiments communication device 200 may include a front end that incorporates a millimeter and sub-millimeter wave radio front end module integrated circuit (RFIC) connected to the same or different antennae. The RFICs may include processing circuitry that implements processing of signals for the desired protocol (e.g., medium access control (MAC), radio link control (RLC), packet data convergence protocol (PDCP), radio resource control (RRC) and non-access stratum (NAS) functionality) using one or more processing cores to execute instructions and one or more memory structures to store program and data information. The RFICs may further include digital baseband circuitry, which may implement physical layer functionality (such as hybrid automatic repeat request (HARQ) functionality and encoding/decoding, among others), transmit and receive circuitry (which may contain digital-to-analog and analog-to-digital converters, up/down frequency conversion circuitry, filters, and amplifiers, among others), and RF circuitry with one or more parallel RF chains for transmit/receive functionality (which may contain filters, amplifiers, phase shifters, up/down frequency conversion circuitry, and power combining and dividing circuitry, among others), as well as control circuitry to control the other RFIC circuitry.

As indicated above, one or more of the network devices shown in FIG. 1 may be implemented, not by physical implementations, but by VNFs. VNFs have taken on increasing significance due to the increasing complexity of the 5G network. In particular, it may be costly or difficult, at best, to update or replace physical network devices when the functionality of the network devices (such as the mobility management entity (MME) and serving and packet data gateways in LTE and 5G architectures and the AMF and SMF in 5G architectures) is to be altered. Software may thus be used to permit general purpose computers in a centralized or distributed manner to provide one or more network functions as one or more VNFs of a Network Function Virtualization (NFV) architecture. The NFV architecture may support multiple independent networks (slices) that may each contain all of the functionality available in the NFV architecture.

Figure 3:
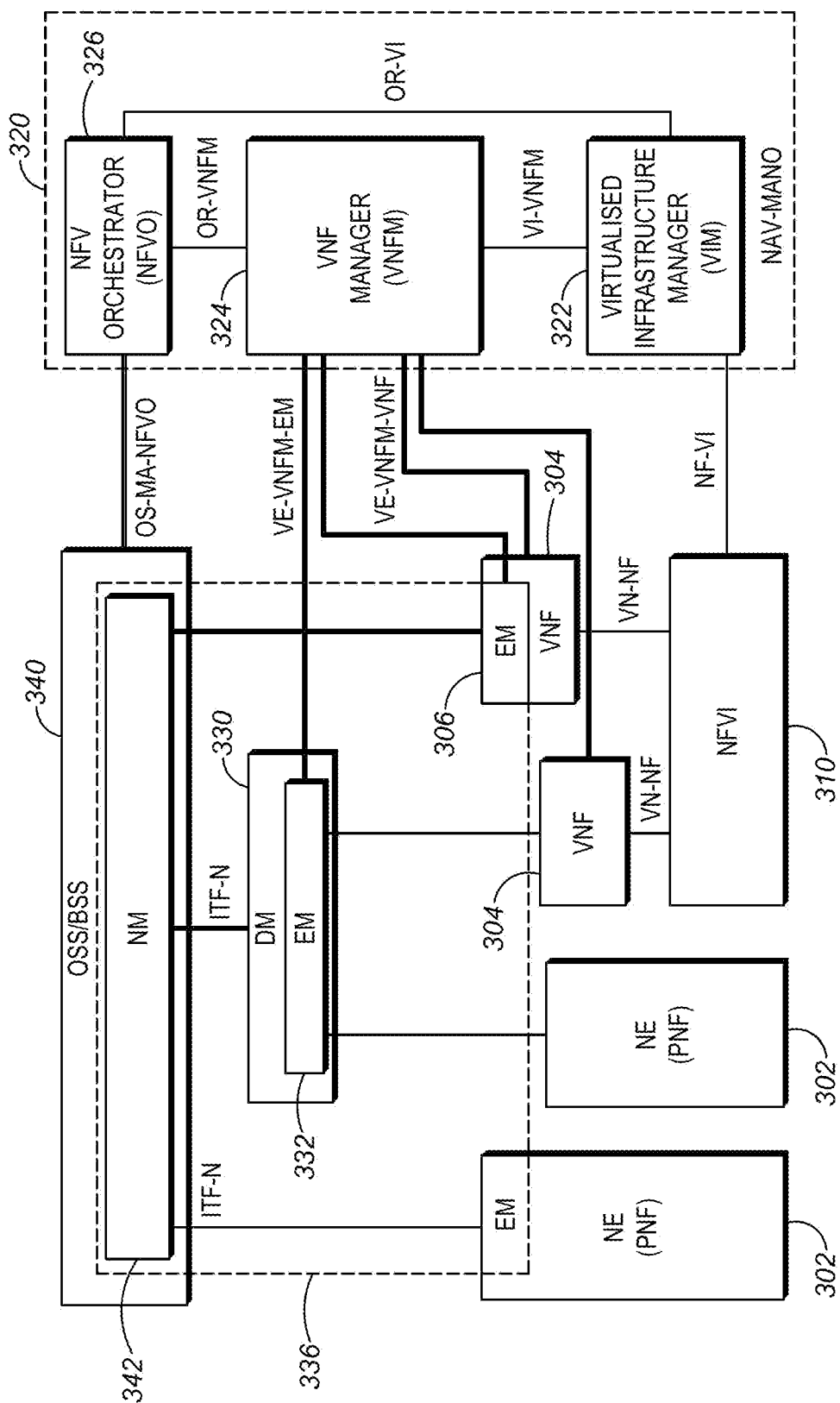
FIG. 3 illustrates an example NFV architecture 300 in accordance with some embodiments.

FIG. 3 illustrates an NFV architecture 300 in accordance with some embodiments. NFV architecture 300 functions to both implement slices and manage and orchestrate the slices so implemented over the life cycle of each slice. The life cycle of each slice may include commissioning (creation/instantiation) of the slice, operation or maintenance of the slice (including activation, supervision, reporting, modification, and de-activation), and decommissioning (termination) of the slice.

NFV architecture 300 may include physical components that implement virtualized components with different functionality. NFV architecture 300 may be implemented by, for example, a data center comprising one or more servers in the cloud. NFV architecture 300 may include one or more physical devices and multiple applications hosted on one or more platforms. These platforms may include, among others, a localized platform, such as a server, or a distributed platform, such as a cloud computing platform or other distributed computing platform. NFV architecture 300 as illustrated may include Network Elements (NEs) 302, Virtual Network Functions (VNFs) 304, a Network Virtualization Function Infrastructure (NVFI) 306, a Network Functions Virtualization Orchestrater (NFV-MANO) 320, a Domain Manager (DM) 330, and an Operations Support System/Business Support System (OSS/BSS) 340.

NEs 302 may provide physical components (physical network functions-PNFs), such as dedicated hardware (e.g., processors, antennas, amplifiers, isolators, clock circuitry, transmit and receive chains, among others), as well as software. NFV architecture 300 may include multiple Network Functions (NFs), which each provides a specific functional behavior and has well-defined external interfaces.

VNFs 304 may be an implementation (both components and connectivity when instantiated) of at least one NF instantiated in or deployed on (runs on) NFVI 310. The VNF thus provides functionality of the NF(s), elements supporting the NF functionalities (e.g., library, database, protocol stacks), and elements enabling VNF 304 to run on NFVI 310. The NF functionality and NF elements supporting the NF functionality in each VNF 304 may be managed by an element manager (EM) 306 in that VNF 304. Each VNF 304 may provide a network function that is decoupled from at least some of the infrastructure resources (computational resources, networking resources, memory) used to provide the NF. VNFs 304 can be chained together to realize a desired network service. The virtualized resources may provide VNFs 304 with desired network resources.

VNFs 304, like NEs 302, may be managed by one or more EMs 306. EM 306 may provide functions for management of virtual or physical network elements, depending on the instantiation. EM 306 may manage individual NEs 302 and NEs 302 of a sub-network, which may include relations between NEs 302. For example, EM 306 of a VNF 304 may be responsible for configuration for the NFs provided by VNF 304, fault management for the network functions provided by VNF 304, accounting for the usage of VNF functions of VNF 304, and collecting performance measurement results for the functions provided by VNF 304.

NFVI 310 includes all hardware and software in the environment in which VNFs 310 are deployed. NFVI 310 contains a NFVI node that has one or more physical devices deployed and managed as a single entity to provide the NFVI functions to support the VNF environment. NFVI 310 may control VNFs 304 via Vn-Nf reference points. Although not shown, NVFI 310 may contain both virtualized and non-virtualized resources that provide computational abilities, storage (either block or file-system level) and networking elements that may include networks, subnets, ports, addresses, links and forwarding rules to ensure intra- and inter-VNF connectivity.

NFV-MANO 320 may include a Virtualized Infrastructure Manager (VIM) 322, a VNF Manager (VNFM) 324, and a Network Function Virtualization Orchestrator (NFVO) 326. NFV-MANO 320 may manage NFVI 310. NFV-MANO 320 may create or terminate a VNF 320, increase or decrease VNF capacity, or update or upgrade software and/or configuration of a VNF 304. NFV-MANO 320 may have access to various data repositories including network services, VNFs available, NFV instances and NFVI resources with which to determine resource allocation.

NFV-MANO 320 may thus orchestrate the instantiation of network services, and the allocation of resources used by VNFs 304. NFV-MANO 320 may, along with OSS/BSS 340, be used by external entities to deliver various NFV business benefits. OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling.

VIM 322 is responsible for controlling and managing the NFVI resources, including the compute, storage and network resources. VIM 322 may be specialized in handling a particular type of NFVI resource (e.g., compute-only, storage-only, networking-only), or may be capable of managing multiple types of NFVI resources. VIM 322 may orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g., hypervisors), and discovery of the capabilities and features (e.g., related to usage optimization) of such resources. To this end, VIM 322 may control and manage the NFVI resources via Nf-Vi reference points. VIM 322 may further collect and forward performance measurements and events to VNFM 324 via Vi-VNFM reference point and to NFVO 326 via the Or-Vi reference point.

VNFM 324 is responsible for the lifecycle management of VNFs 324 through a Ve-Vnfm-vnf reference point. VNFM 324 may orchestrate NFVI resources via VIM 322 and provide overall coordination and adaptation for configuration and event reporting between VIM 322 and EMs 306 and Network Managers (NMs) 342 via a Ve-Vnfm-em reference point. VNFM 350 may be assigned the management of a single VNF 320, or the management of multiple VNFs 320 of the same type or of different types. To this end, VNFM 324 may discover available services, manage virtualized resource availability/allocation/release and provide virtualized resource fault/performance management, in addition to providing service lifecycle management that may include instantiating a VNF, modifying the VNF instances, and terminating the network service, as well as releasing the NFVI resources for the service to the NFVI resource pool to be used by other services.

NFVO 326 manages the Network Service (NS) lifecycle and coordinates the management of the NS lifecycle, the VNF lifecycle (supported by the VNFM) and the NFVI resources (supported by VIM 322) to ensure an optimized allocation of the necessary resources and connectivity. NFVO 326 may coordinate VNFs 304 as part of network services that jointly realize a more complex function, including joint instantiation and configuration, configuring connections between different VNFs 304 and managing dynamic changes of the configuration. NFVO 326 may provide this orchestration through an OS-Ma-NFVO reference point with NM 342 of the OSS/BSS 340, which may also include a domain manager (DM) 330 that itself contains an EM 332.

EMs 306, 322 (whether in a VNF 306 or NE 302) may be managed by NM 342 of OSS/BSS 340 through Itf-N reference points. NM 342 may provide functions with the responsibility for the management of a network, mainly as supported by EM 332 but may also involve direct access to the network elements. NM 342 may connect and disconnect VNF external interfaces to physical network function interfaces at the request of NFVO 326.

As above, with the advent of 5G networks and disparate types of devices (such as Machine Type Communication (MTC), enhanced Mobile Broadband (eMBB) and Ultra-Reliable and Low Latency Communications (URLLC) devices) using these networks, network management and network slicing is evolving towards a service-based architecture in which virtualization is used. To provide network management and slicing, network provisioning and resource management, fault supervision, performance management (PM) and reporting, and management data analytics may be enabled.

Network slicing is virtualization that uses the architecture shown in FIG. 3 to provide multiple configurable logical and independent networks as independent network slice instances (NSIs) to different consumers, such as eMBB, healthcare, automotive, safety or mission critical, and IoT users. Each NSI may provide a desired network service, which is isolated from the network resources of other NSIs and may thus allow an optimized topology and specific configuration to be developed for each NSI based on the desired network services. Examples of various network services may include big data, edge computing, cloud storage, and platform security, among others. The configuration may enable various aspects of network capability to be tailored for the NSI. These aspects may include guaranteed Quality of Service (QoS), throughput, latency, reachability, data security, mobility, and massive connectivity, among others.

For example, an eMBB NSI may be designed to contend with large data volumes and increased data capacity and user density, a massive MTC NSI may be designed to support large numbers of connected devices with low data rates, and a URLLC NSI may be designed to cater for mission-critical situations and devices. In particular, an NSI designed for a massive number of IoT devices, which may have unique charging and control functionality that are dependent on the industry requesting the NSI—in one instance, real-time vehicle traffic information, which may collect a large number of disparate pieces of information from MTC terminals in vehicles and infrastructure for analysis and dissemination to users (e.g., map updates and route determination). Vehicles themselves may use a different NSI to enable URLLC for autonomous driving, vehicle-to-vehicle (V2V) communication, and data gathering and analysis from telemetry sensors, while also providing high throughput for entertainment functionality.

Each NSI may contain one or more Network Slice Subnet Instance (NSSIs) that are each associated with different portions of the core network (CN) or access network. An NSSI represents a group of NFs and may be associated with one or more NSIs. This permits the lifecycle of the NSSI to be managed independently from the lifecycle of an NSI. The NSSIs may be implemented as different core networks, such RAN and 5GC.

Figure 4:
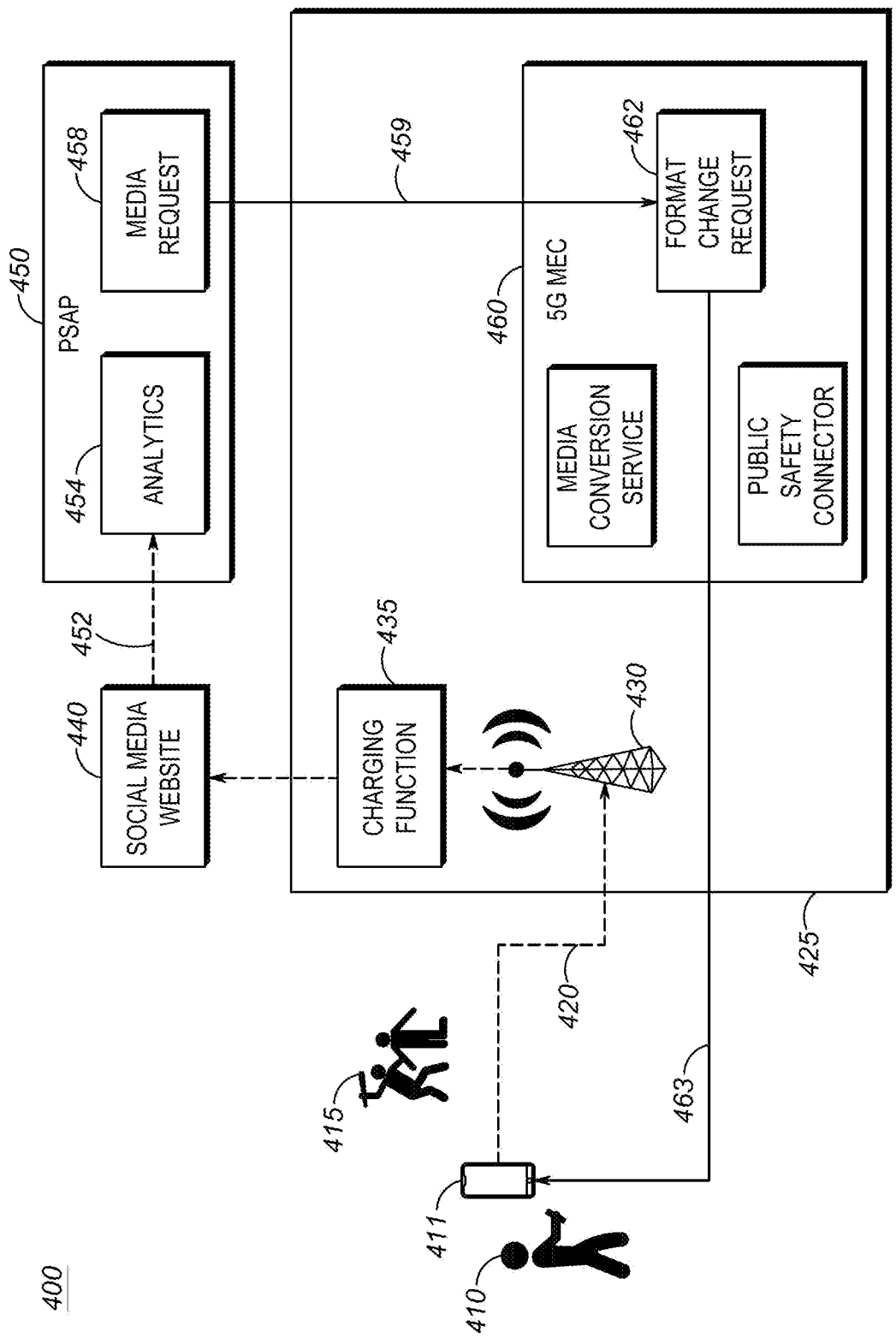
FIG. 4 illustrates an example environment in which a format change may be requested without incurring additional costs according to the techniques described herein.

FIG. 4 illustrates an example environment 400 in which a format change may be requested without incurring additional costs according to the techniques described herein. FIG. 4 includes a user 410 who is in possession of a device 411 that is capable of recording media. For example, the device may be a smartphone that is equipped with a camera that is capable of recording video. Device 411 may generally be a device that could be implemented on the physical hardware described with respect to FIG. 2.

Although the most common type of media that is recorded will be video (including associated audio) it should be understood that the techniques described herein are not so limited. Media could include still photographs, audio, or any other type of media. What should be understood is that the media is capable of being transmitted via a network and that the media may be converted between formats. Although the remainder of this description will be described using formats most applicable to video, it should be understood that this is for ease of description, and not by way of limitation.

Environment 100 may also include a network 425. The network 425 may be a network such as the network described with respect to FIGS. 1 and 3 (e.g. a 5G network). Although described with respect to a 5G network, it should be understood that the techniques described herein are applicable to any type of network that provides the functionality described below. Suitable networks could also include 3G, LTE, WiFi, etc. networks.

The network may include a RAN 430 which allows for wireless communication between the device 411 and the network 425. As described above the RAN 430 allows the device 411 to connect to external endpoints. The network may also include a Mobile Edge Computing (MEC) node 460. The MEC 460 may be implemented as a network function using dedicated hardware or as a network virtual function. The MEC could be implemented anywhere within the network as described in FIG. 1. In one example implementation, the MEC could be implemented collocated with the RAN 430. It should be understood that this is simply an example implementation and is not intended to be limiting.

The network 425 may also include a charging function 435. The charging function 435 may be used to measure the usage of the network by device 411 for purposes of billing the user 410 for use of the network. For example, the charging function may monitor the amount of data that device 411 is sending over the network 425. As will be explained in further detail below, the MEC 460 may have the ability to generate data streams that are allowed to bypass the charging function 435, thus preventing the user 410 from being billed for that usage.

The environment 400 may also include social media website 440. The particular social media website is of no particular importance. What should be understood is that the social media website 440 may receive streamed media from a user, such as user 410 using user device 411. The social media website 440 may then make that streamed media available to the public.

The environment 400 may also include a Public Safety Access Point (PSAP) 450. A PSAP may be a location, such as a call center, where requests for public safety assistance may be received. In the United States, the most common PSAPs 450 are 911 call centers that handle emergency calls. Although the PSAP 450 performs many functions, for ease of description only a subset of those functions are described. The PSAP 450 may monitor the media streams originated from the social media websites. The PSAP 450 may also request the media be sent to the PSAP in a different format than that which was sent to the social media website.

In operation, the user 410 may see an event that is considered to be of interest. In this particular example, the event of interest may be a physical fight 415 between two individuals. It should be understood that the specific event of interest is of little importance. What should understood is that the user 410 feels the event is of sufficient interest that they wish to use their device 411 to capture the incident and stream the incident to a social media site 440.

The user 410 may then user their device 411 to begin recording video of the event 415 and streaming the video to the social media website. The streamed media may be sent in a first format. Some examples of format parameters may include a resolution of the video (e.g. 720p standard definition, 1080p high definition, 4k ultra high definition, etc.), a frame rate of the video (e.g. 30 frames per second, 60 frames per second, etc.) or a particular video coder/decoder (codec) that is used.

The format used to send the media stream may be constrained in multiple ways. For example, the social media website 440 may only accept certain formats (e.g. video greater than 720p not accepted, frame rates above 30 not accepted, limited number of supported codecs, etc.). The device 411 will typically have an app associated with the social media website installed for purposes of streaming media, and that app may restrict the formats that may be used when streaming to the social media website.

The restriction on formats may also come from the user themselves. As mentioned above, the charging function 435 may bill the user based on network usage. In general, higher quality formats user more data than lower quality formats and as such steaming media in a higher quality uses more data and thus costs more. The user 410 may wish to limit the amount that is spent when streaming media and thus may limit the particular formats used.

The media stream in the initial format is depicted by the dashed line 420. The media 420 is received by the RAN 430, passes through the charging function 435 for billing purposes, and is then sent to the social media website 440. The social media website may then send the media stream out to the public. One particular recipient of that media stream sent by the social media website 440 may be the PSAP 450. As shown by dotted line 452, the media stream in the first format may be sent to the PSAP 450.

The PSAP 450 may then monitor the media stream 452 to identify events of interest to public safety. For example, the physical fight 415, because it involves a potential crime, may be of interest to public safety personnel. Other events (e.g. a person streaming video of a cute dog, etc.) may not be of interest to the PSAP. In some implementations, personnel at the PSAP 450 may manually monitor media streams from social media websites to identify events of interest. Alternatively, PSAPs 450 may implement sophisticated analytics 454 to automatically review media streams and identify those that may be of interest. Such analytics techniques are known and the techniques described herein are suitable for use with any currently available or later developed analytics techniques.

Once a media stream of interest is identified, it may be determined if the media stream is in a format that is suitable for use by public safety personnel. As explained above, the quality of the media stream sent from the user device 411 may be limited by many factors including the social media website 440 and the user themselves. In some cases that quality may not be sufficient for public safety use. For example, video in 720p resolution may not be sufficiently clear for identifying suspects in a criminal event.

If the analytics 454 determine that the media stream received from the social media website 440 is acceptable, no further action is taken. If however, the format of the media stream is not acceptable, the analytics 454 may notify a media request module 458. The media request module may send a request to the network 425 for the media stream to be sent in a format (typically a higher quality format) than what is being sent to the social media website. In particular the media request module 458 may send a request 459 to the MEC 460 requesting the media stream in a second format (e.g. the higher quality format, etc.).

The MEC 460 may include a format change request module 462 to receive the request 459 from the media request module 458. The format change module may then send a request 463 to the device 411 for the media to be streamed in the format that has been requested by the media request module 458. It should be noted that the ability to receive the request 463 by the device 411 may be dependent on either an app being installed on the user device 411 or the functionality being included in the app provided by the social media website 440 for media streaming. It should further be understood that the request 463 to stream media in the second format is just that, a request. In some implementations, the user 410 may be prompted for approval prior to any format change.

Figure 5:
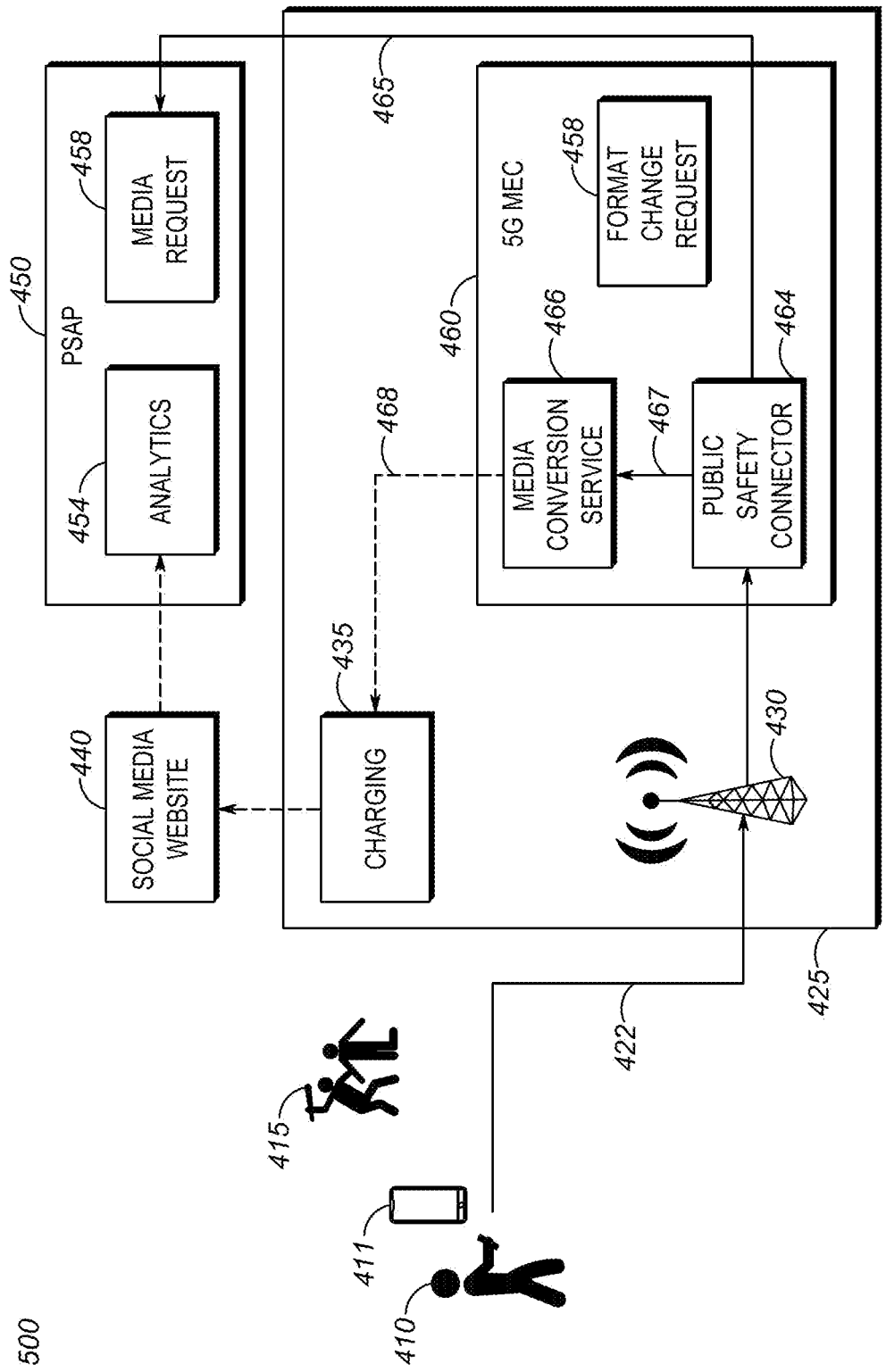
FIG. 5 illustrates an example environment in which a format change request may be accepted without incurring additional costs according to the techniques described herein.

FIG. 5 illustrates an example environment 500 in which a format change request may be accepted without incurring additional costs according to the techniques described herein. In FIG. 5, it is assumed that the user 410 has accepted the request 463 to begin streaming in the second format. The device 411, upon acceptance of the request 463 to stream the media in the second format begins streaming in the second format as shown by solid line 422. Just as with media stream 420, the media stream is sent to the RAN 430.

However, instead of being sent directly to the social media website 440 through the charging function 435, the media stream 422 is instead sent to a public safety connector 464 of the MEC 460. The public safety connector 464 may be connected with the PSAP 450 using an interface that allows the streamed media in the second format to be sent to the PSAP as indicated by the line 465. Thus the PSAP 450 is able to receive the streamed media 422 in the requested second format. The particular form of the connection between the MEC 460 and the PSAP 450 is relatively unimportant. Currently PSAPs have the ability to received streamed media from many different sources through readily available application programming interfaces and publically available websites.

In one implementation, the PSAP 450 is connected to the network 425 in the same manner that the device 411 is connected. The media stream 411 sent in the second format may then be sent to the PSAP 450 using a separate network slice than that which is used to send the media stream in the first format to the social media website 440. In some cases, the network slice used to send the media in the second format to the PSAP 450 may be a dedicated network slice. By using a dedicated network slice, it can be ensured that an end to end quality of service level for the media stream in the second format can be maintained.

In addition to sending the media stream in the second format 465 to the PSAP 450, the public safety connector 464 also sends the media stream in the second format 467 to the media conversion service 466. The media conversion service 466 converts the media from the second format back into the first format. It should be understood that performing this conversion on the MEC 460 is preferable to performing it on the device 411 because it does not require the device to perform extra processing, which would in turn lead to extra battery use.

The media stream 468, depicted by the dashed line is now back to the original format 420. The media conversion service then sends the media stream in the first format 468 to the charging function 435, which then sends it on to the social media website 440. It should be understood that from the perspective of the social media website, there is no difference between the streams 420 and 468. As such, the stream 468 meets all criteria specified by the social media website 440. Likewise, since the stream seen by the charging function is also the same, there is no difference in the amount the user is charged. Thus, public safety is able to receive the media stream in the desired format without the user 410 incurring any additional charges.

Figure 6:
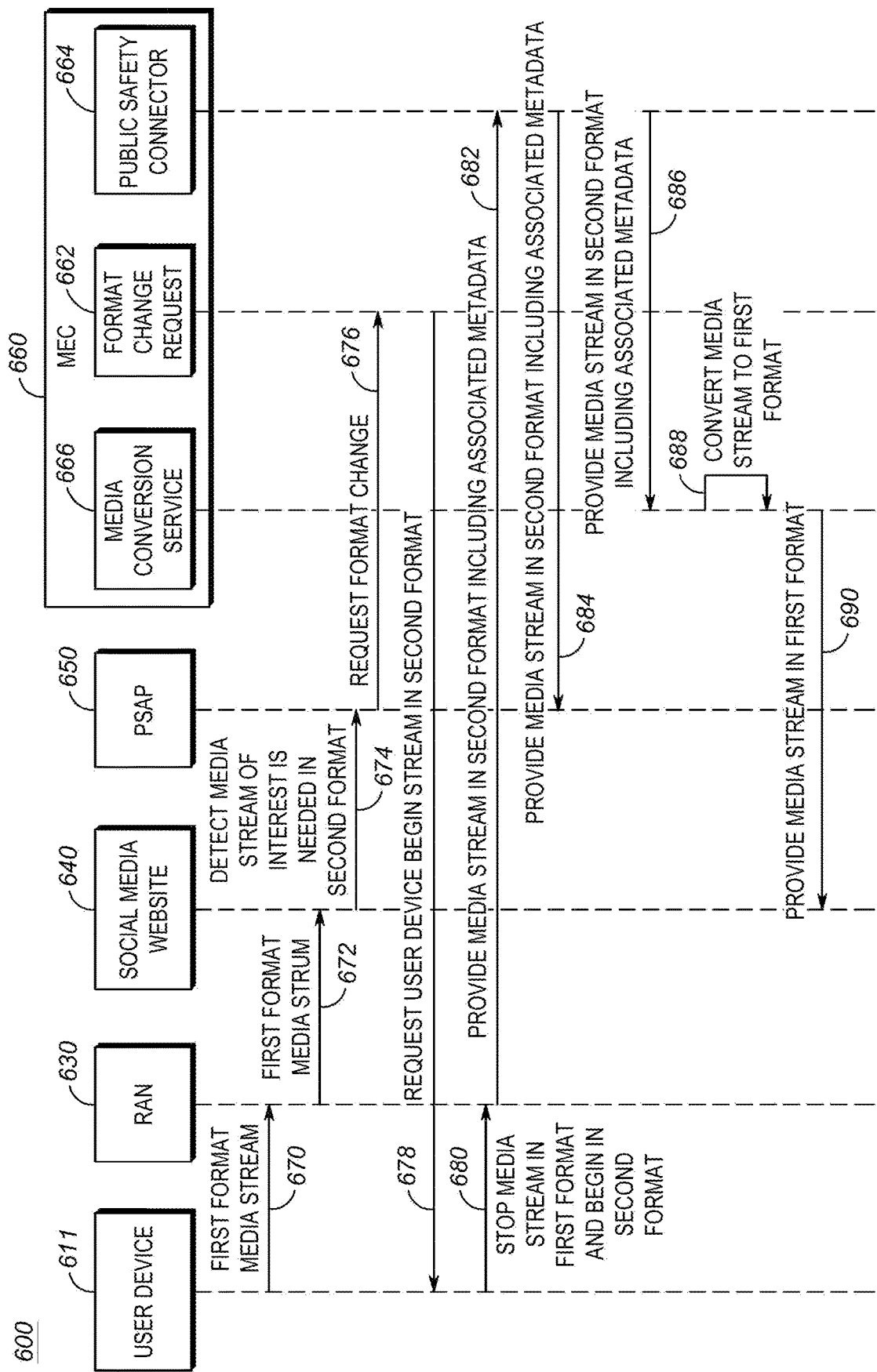
FIG. 6 is an example of a message sequence diagram in accordance with the techniques described herein.

FIG. 6 is an example of a message sequence diagram 600 in accordance with the techniques described herein. The elements described with respect to FIG. 6 are generally consistent with those described with respect to FIGS. 4 and 5 and are numbered similarly. For purposes of ease of description, the description of those elements is not repeated here. Message sequence diagram 600 includes a user device 611, a radio access network 630, a social media website 640, a public safety access point 650, and a mobile edge computing node 660. The mobile edge computing node 660 includes a media conversion service 666, a format change request module 662, and a public safety connector 664.

In operation, the user device may stream 670 media in a first format to the RAN 630. Although not shown, the media stream in the first format 670 may include metadata associated with the stream (e.g. geolocation of where the stream is recorded, etc.). The RAN 630 may then send 672 the media stream in the first format to the social media website 640. The social media website 640 may the make the media stream publically accessible (not shown). The metadata received with the stream in the first format may not be distributed on the publically available social media website 640.

The PSAP 650 may monitor the public, social media website media stream to determine if there are any of interest to the PSAP. If there are, and the first format is suitable for use by the PSAP 650, the PSAP may simply use that stream. However it may be detected by the PSAP 650 that the media stream of interest is needed in a second format 674. Typically, this will mean the media stream is needed in a higher quality format, but the techniques described herein are not so limited.

The PSAP 650 may send a request to the MEC 660 for a format change. In particular, the request for the format change 676 may be sent to a format change request module 662. The format change request module 662 may send a request 678 to the user device 611 to begin the stream in the second format as needed by the PSAP 650. Upon receipt of the request, the user device 611 may prompt the user to accept the request (not shown). Assuming the user accepts the request, the user device 611 may stop the media stream in the first format, and begin the media stream in the second format 680 and send the media stream in the second format to the RAN 630. It should be noted that the media stream in the second format includes the metadata.

The RAN 630 may provide the media stream in the second format to the MEC 660. In particular, the media stream in the second format including the associated metadata 682 may be sent to the public safety connector 664 module. The public safety connector module may provide the media stream in the second format, including the associated metadata 684 to the PSAP 650. In addition, the public safety connector 664 module may provide the media stream in the second format including the associated metadata 686 to the media conversion service 666 of the MEC 660.

The media conversion service 666 may convert the media stream to the first format 688. The media stream in the first format may then be provided 690 to the social media website. As should be clear, from the perspective of the social media website, the media stream in the first format 672 is the same as the converted media stream in the first format 690.

Figure 7A:
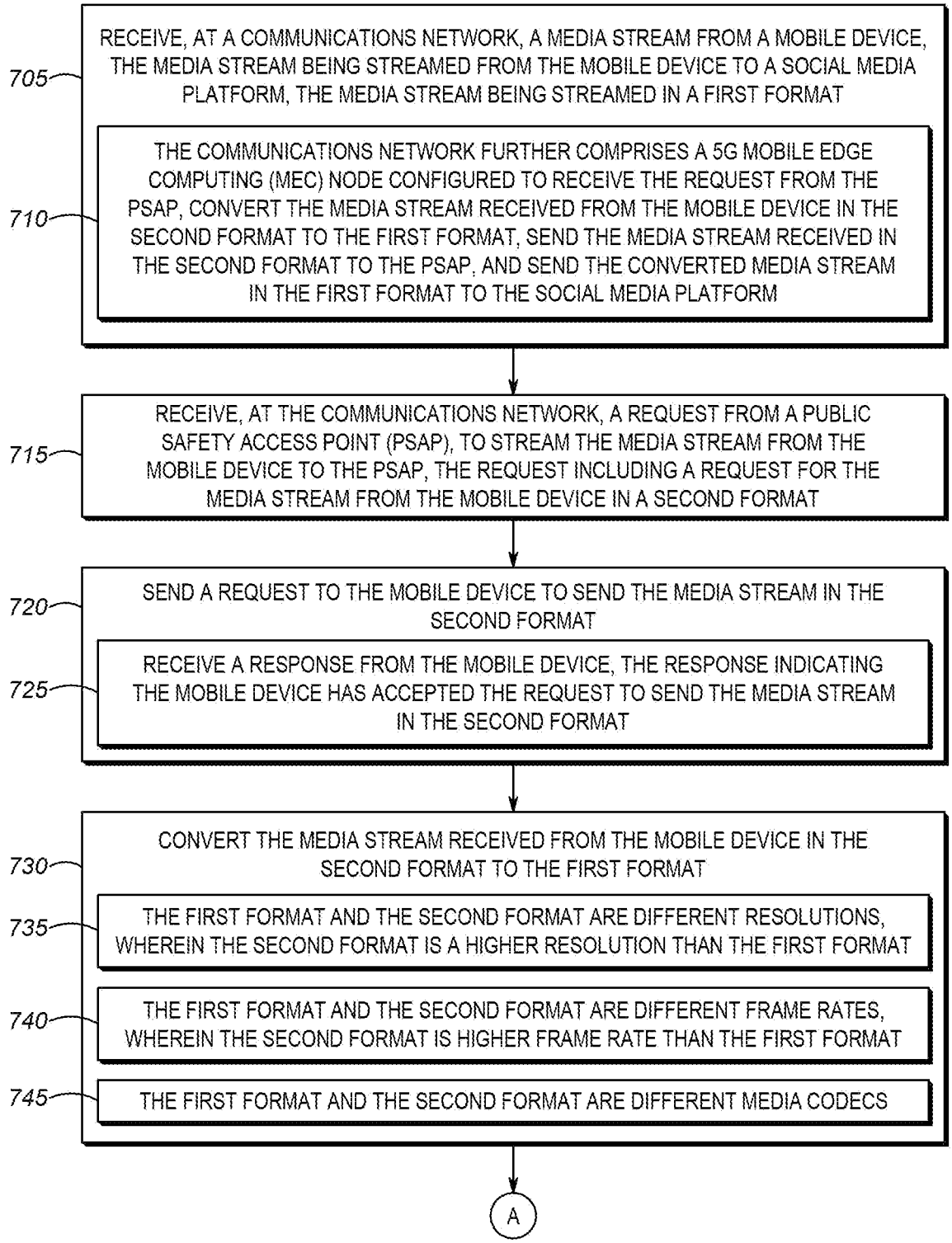
FIGS. 7A and 7B are an example of a flow diagram in accordance with the streaming media without incurring additional user costs techniques described herein.
Figure 7B:
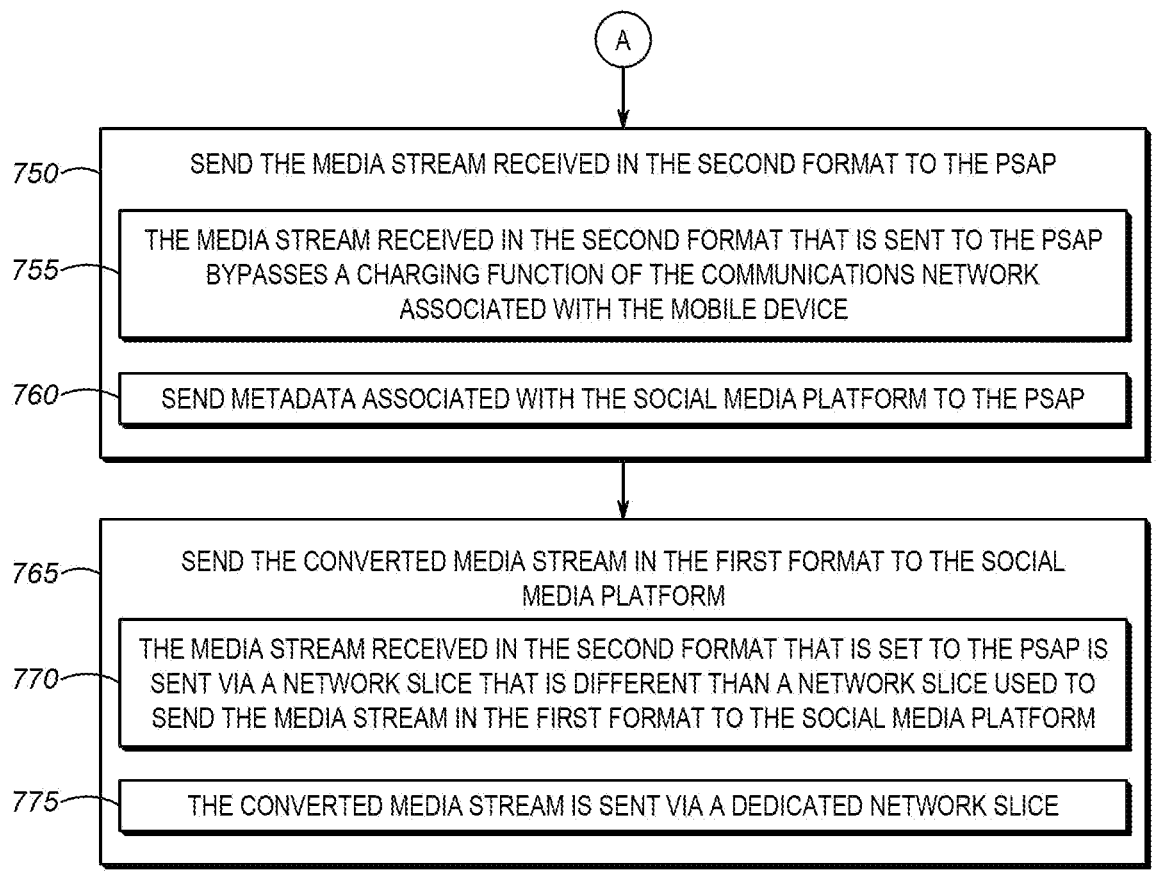

FIGS. 7A and 7B are an example of a flow diagram 700 in accordance with the streaming media without incurring additional user costs techniques described herein. In block 705, a media stream from a mobile device may be received at a communications network. The media stream being streamed from the mobile device to a social media platform. The media stream being streamed in a first format. As explained above, a user may, independently of any public safety involvement, desire to stream a media to a social media site that allows live streaming of media.

In many cases, the type of media will be video (including associated audio), however the techniques described herein are not limited to video only. The media stream may be sent in a first format. The specific choice of the first format is not relevant and some example formats are described below. What should be understood is that the first format is one that is acceptable by both the user (for purposes of data usage which may incur costs on the user) and the social media website (which may wish to only allow streaming media in specific formats and/or bandwidth usage.

In block 710, in one example, the communications network further comprises a 5G Mobile Edge Computing (MEC) node configured to receive the request from the PSAP, convert the media stream received from the mobile device in the second format to the first format, send the media stream received in the second format to the PSAP, and send the converted media stream in the first format to the social media platform. The process of conversion of the media stream from one format to another will be described in further detail below.

What should be understood is that in one example implementation, the communications network is a 5G network, and the media stream conversion occurs in a MEC node, which may be a physical or virtual node. In other example implementations, the communications network may be a 3G or LTE/4G network with the MEC functionality provided at a different location within the network (e.g. within the packet core network). What should be understood is that the techniques described herein are suitable for use with any type of communications network, not just a 5G based network. The techniques are also suitable for use with any later developed communications network technology that is capable of providing the functionality of the MEC described herein.

In block 715, a request may be received, from a Public Safety Access Point (PSAP), at the communications network. The request may be a request to stream the media stream from the mobile device to the PSAP, the request including a request for the media stream from the mobile device in a second format. As explained above, in some cases, the PSAP may be monitoring media streams from the social media website. The monitoring may occur manually or via known automated video analytics. In some cases, the media stream from the social media website may be of interest to public safety officials. In some cases, the media stream being sent by the mobile device (e.g. in the first format, etc.) may not be suitable for use for public safety purposes. In many cases, it may not be suitable because the quality is considered too low. However, there could be situations where the streamed media is not suitable for use because the quality is too high.

In block 720, a request may be sent to the mobile device to send the media stream in the second format. In some cases, the request may be sent to a standalone app (e.g. an app associated with the public safety system) on the mobile device to receive the request to being streaming in the second format. In other cases, the social media website app installed on the user device may be configured to receive the request. Regardless of how received, the request to request is received at the user device. In the case of a 5G implementation including a MEC, the request may originate from a format change request module within the MEC.

In block 725, a response from the mobile device may be received. The response may indicate that the mobile device has accepted the request to send the media stream in the second format. As explained above, in some implementations, permission must first be obtained from the user of the device streaming media prior to changing the format. As such, if the user rejects the request to begin streaming media in the second format, then the PSAP may be limited to whatever processing it can do with the media stream as it is being sent out by the social media site.

In block 730, the media stream received from the mobile device in the second format can be converted to the first format. In other words, the first format that was initially received from the user device can be recreated from the media stream in the second format. As will be explained in further detail below, the converted media stream may then be sent to the social media website. The media conversion may occur within the media conversion service of the MEC in a 5G implementation. In implementations using other network types, the conversion can be done within any suitable similar network entity.

Block 735 is an example of first and second formats wherein the first format and the second format are different resolutions, wherein the second format is a higher resolution than the first format. Media, in particular video media, can be captured in multiple, different resolutions. For example, 720p (standard definition), 1080p (high definition), and 4k (ultra high definition). It should be noted that in many cases, the second format may be a higher resolution than the first format. However, this may not always be true. For example, the social media website may accept streaming video in 4k UHD, while the PSAP may only be capable of receiving 1080p HD. In such a case, the phone would continue to send video at the higher resolution to the video conversion service of the MEC, which would then convert the media stream to the lower resolution for sending on to the PSAP.

Block 740 is another example of first and second formats wherein the first format and the second format are different frame rates, wherein the second format is higher frame rate than the first format. For example, a first frame rate may be 30 frames per second(fps), while the second frame rate may be 60 fps. The media may initially be streamed to the social media website at 30 fps, which may not be suitable for use by the PSAP, which may require 60 fps.

Block 745 is yet another example of first and second formats wherein the first format and the second format are different media codecs. Media streams may rely on video and audio coders/decoders, also referred to as codecs, to convert captured video into a format that is more easily transmitted over a network (e.g. compression, audio encoding schemes, video encoding schemes, etc.). Codecs tend to not be compatible with each other. As such, if the PSAP is only capable of using one type of codec, that is different than the first format, it may request the stream in a second format that uses the codec compatible with the PSAP.

It should be noted that although three formats (resolution, frame rate, and codec) were described, this was for purposes of ease of description only. Any types of different formats are suitable for use with the techniques described herein. It should also be understood that a format need not be defined by a single parameter and could be a combination of parameters. For example, a first format may be a media stream in 720p, at 30 fps, using codec A, while a second format could be the same media stream at 1080p, at 60 fps, using codec B.

In block 750, the media stream received in the second format may be sent to the PSAP. For example, the media conversion service may send the media received from the user device (in the second format, assuming the request was accepted) can be sent directly to the PSAP. AS the second format was requested by the PSAP, it can directly use the media stream sent in that format.

In block 755, the media stream received in the second format that is sent to the PSAP bypasses a charging function of the communications network associated with the mobile device. As mentioned above, one of the problems solved herein is that the user should not be charged for higher data usage when the second format is more data intensive than the first format. As such, the stream to the PSAP may completely bypass a charging function associated with the user. Although not shown, it is possible that the media stream sent to the PSAP in the second format may pass through a charging function associated with the PSAP, thus causing all costs for the streaming to the PSAP to be incurred by the PSAP. What should be understood is that although someone may be paying for the extra data use, it will not be the user that streamed media to the social media website.

In block 760, metadata associated with the social media platform may be sent to the PSAP. As mentioned above, the media stream sent from the user device to the social media website may include metadata that the social media website does not send out to the public. For example, the geolocation of the user may be sent to the social media website, but that information is not broadcast out to the public. Other examples may include the user's phone IMSI, their userID on the social media website (e.g. not their public username), their phone number, etc. This meta data may be useful to the PSAP. As such, the meta data associated with the social media platform may be sent to the PSAP along with the media stream in the second format.

In block 765, the converted media stream in the first format may be sent to the social media platform. For example, the media conversion service of the MEC may convert the media back to the first format, and send it on to the social media website. As this is the format that the social media website originally received, there is no change on the part of the social media website. Furthermore, the converted media stream may be sent through the charging function associated with the user. Thus the user may still be billed for the data that would have been used originally (e.g. for the data used sending the media stream in the first format).

In block 770, the media stream received in the second format that is sent to the PSAP is sent via a network slice that is different than a network slice used to send the media stream in the first format to the social media platform. As mentioned above, network slices are a concept in 5G networks that allows for end to end data transmission with defined levels of quality of service(QoS). In some implementations data sent to the PSAP may use a slice with higher QoS parameters than the slice used to send data to the social media website.

In block 775, the converted media stream is sent via a dedicated network slice. In some cases, the network may be implemented such that a certain type of traffic, for example traffic to a specific destination, may be aggregated onto a single network slice that is only used for that destination. By segregating a network as such, QoS may be guaranteed for applications transmitting data using the dedicated slice.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot convert streaming media from one format to another, among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
receiving, at a communications network, a media stream from a mobile device, the media stream being streamed from the mobile device to a social media platform, the media stream being streamed in a first format;
receiving, at the communications network, a request from a Public Safety Access Point (PSAP), to stream the media stream from the mobile device to the PSAP, the request including a request for the media stream from the mobile device in a second format;
sending a request to the mobile device to send the media stream in the second format;
receiving, at the communications network, from the mobile device, the media stream in the second format:
converting the media stream received from the mobile device in the second format to the first format;
sending the media stream received in the second format to the PSAP; and
sending the converted media stream in the first format to the social media platform.

2. The method of claim 1 wherein the first format and the second format are different resolutions, wherein the second format is a higher resolution than the first format.

3. The method of claim 1 wherein the first format and the second format are different frame rates, wherein the second format is higher frame rate than the first format.

4. The method of claim 1 wherein the first format and the second format are different media codecs.

5. The method of claim 1 wherein the media stream received in the second format that is sent to the PSAP bypasses a charging function of the communications network associated with the mobile device.

6. The method of claim 1 wherein the media stream received in the second format that is sent to the PSAP is sent via a network slice that is different than a network slice used to send the media stream in the first format to the social media platform.

7. The method of claim 1 wherein the communications network further comprises a 5G Mobile Edge Computing (MEC) node configured to receive the request from the PSAP, convert the media stream received from the mobile device in the second format to the first format, send the media stream received in the second format to the PSAP, and send the converted media stream in the first format to the social media platform.

8. The method of claim 7 wherein the converted media stream is sent via a dedicated network slice.

9. The method of claim 1 further comprising:
receiving a response from the mobile device, the response indicating the mobile device has accepted the request to send the media stream in the second format.

10. The method of claim 1 further comprising:
sending metadata associated with the social media platform to the PSAP.

11. A system comprising:
a processor; and
a memory coupled to the processor, the memory containing a set of instructions thereon that when executed by the processor cause the processor to:
receive, at a communications network, a media stream from a mobile device, the media stream being streamed from the mobile device to a social media platform, the media stream being streamed in a first format;
receive, at the communications network, a request from a Public Safety Access Point (PSAP), to stream the media stream from the mobile device to the PSAP, the request including a request for the media stream from the mobile device in a second format;
send a request to the mobile device to send the media stream in the second format;
receive, at the communications network, from the mobile device, the media stream in the second format;
convert the media stream received from the mobile device in the second format to the first format;
send the media stream received in the second format to the PSAP; and
send the converted media stream in the first format to the social media platform.

12. The system of claim 11 wherein the media stream received in the second format that is sent to the PSAP bypasses a charging function of the communications network associated with the mobile device.

13. The system of claim 11 wherein the communications network further comprises a 5G Mobile Edge Computing (MEC) node configured to receive the request from the PSAP, convert the media stream received from the mobile device in the second format to the first format, send the media stream received in the second format to the PSAP, and send the converted media stream in the first format to the social media platform.

14. The system of claim 11 wherein the memory further comprises instructions to:
receive a response from the mobile device, the response indicating the mobile device has accepted the request to send the media stream in the second format.

15. The system of claim 11 wherein the memory further comprises instructions to:
send metadata associated with the social media platform to the PSAP.

16. A non-transitory processor readable medium containing a set of instructions thereon that when executed by a processor cause the processor to:
receive, at a communications network, a media stream from a mobile device, the media stream being streamed from the mobile device to a social media platform, the media stream being streamed in a first format;
receive, at the communications network, a request from a Public Safety Access Point (PSAP), to stream the media stream from the mobile device to the PSAP, the request including a request for the media stream from the mobile device in a second format;
send a request to the mobile device to send the media stream in the second format;
receive, at the communications network, from the mobile device, the media stream in the second format;
convert the media stream received from the mobile device in the second format to the first format;
send the media stream received in the second format to the PSAP; and
send the converted media stream in the first format to the social media platform.

17. The medium of claim 16 wherein the media stream received in the second format that is sent to the PSAP bypasses a charging function of the communications network associated with the mobile device.

18. The medium of claim 16 wherein the communications network further comprises a 5G Mobile Edge Computing (MEC) node configured to receive the request from the PSAP, convert the media stream received from the mobile device in the second format to the first format, send the media stream received in the second format to the PSAP, and send the converted media stream in the first format to the social media platform.

19. The medium of claim 16 wherein the medium further comprises instructions to:
receive a response from the mobile device, the response indicating the mobile device has accepted the request to send the media stream in the second format.

20. The medium of claim 16 wherein the medium further comprises instructions to:
send metadata associated with the social media platform to the PSAP.

\* \* \* \* \*